July 29, 1930. H. B. LAWSON 1,771,576
TAKE-OFF DEVICE FOR GLASS FORMING MACHINES
Filed Nov. 3, 1924 3 Sheets-Sheet 2
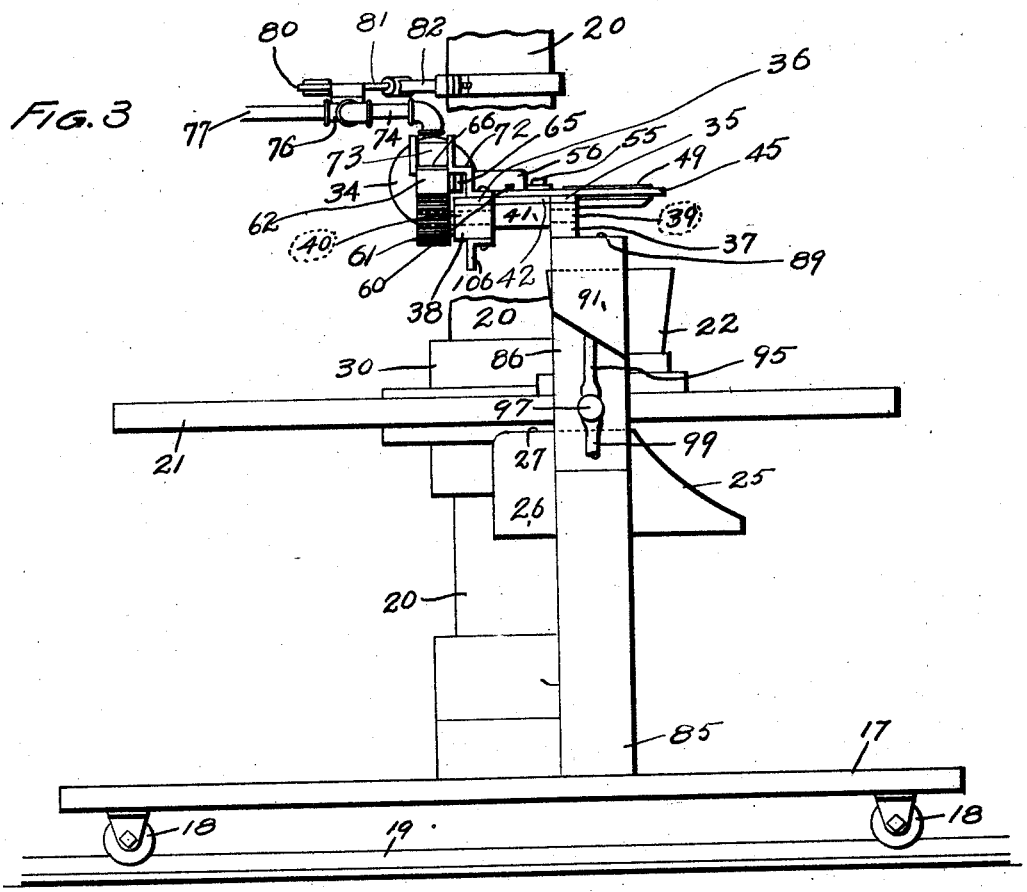
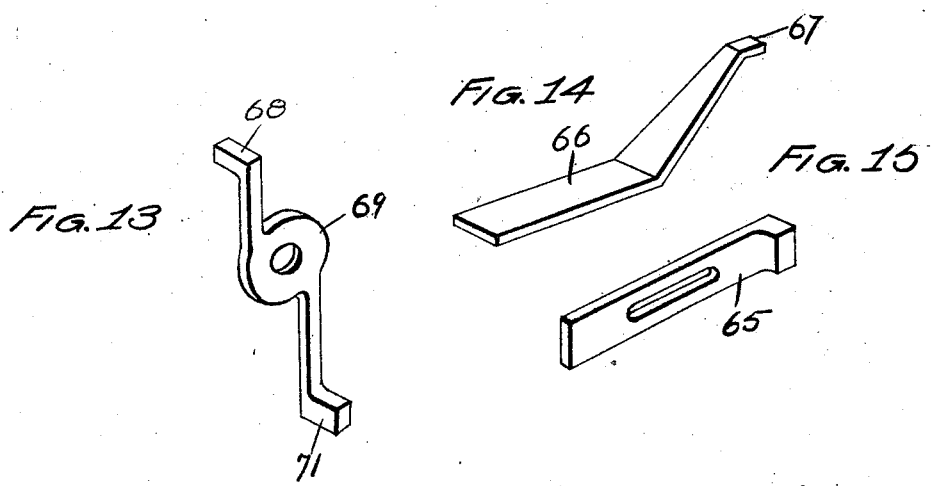
INVENTOR
HARRY B. LAWSON
ATTY.

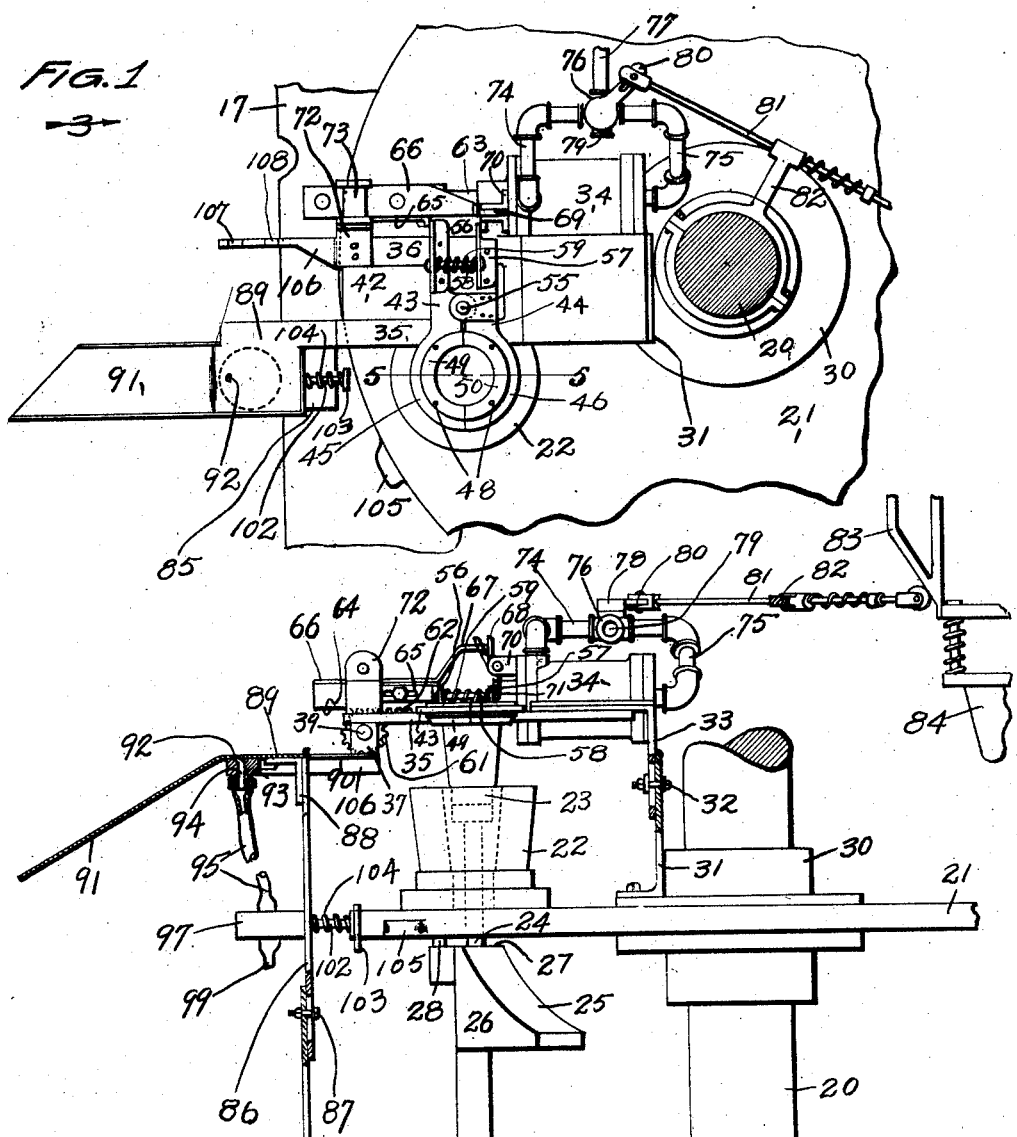

July 29, 1930.   H. B. LAWSON   1,771,576
TAKE-OFF DEVICE FOR GLASS FORMING MACHINES
Filed Nov. 3, 1924   3 Sheets-Sheet 3
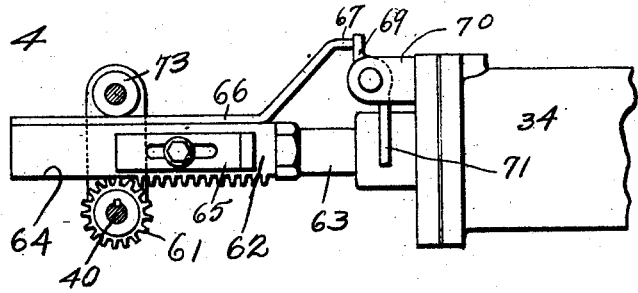
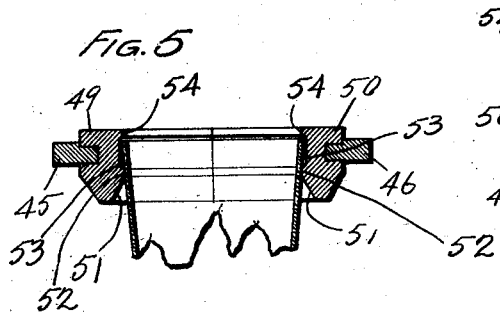
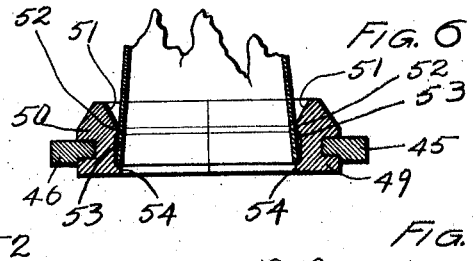
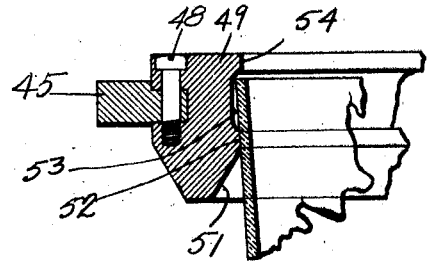
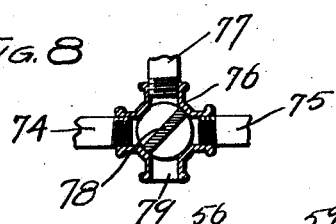
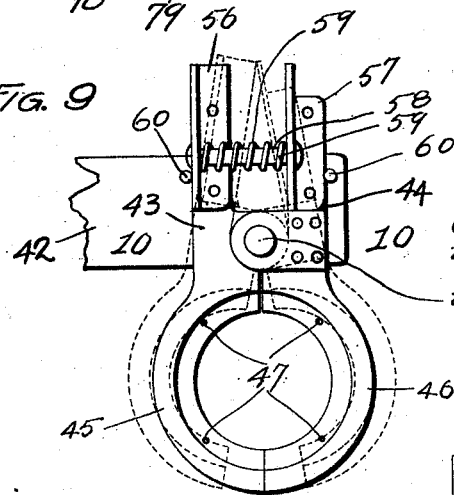
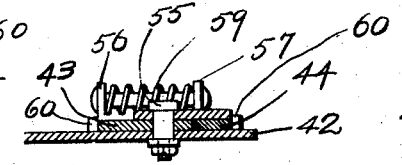
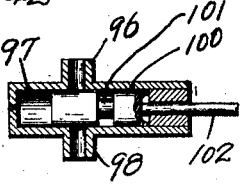
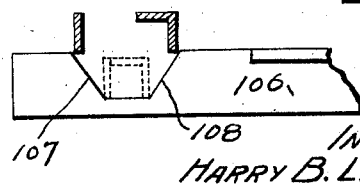
INVENTOR
HARRY B. LAWSON
ATTY.

Patented July 29, 1930

1,771,576

UNITED STATES PATENT OFFICE

HARRY B. LAWSON, OF HUNTINGTON, WEST VIRGINIA, ASSIGNOR, BY MESNE ASSIGNMENTS, TO BALL BROTHERS COMPANY, OF MUNCIE, INDIANA, A CORPORATION OF INDIANA

TAKE-OFF DEVICE FOR GLASS-FORMING MACHINES

Application filed November 3, 1924. Serial No. 747,505.

My invention relates to improvements in take-off devices for glass forming machines and has for its primary object a device which is operated synchronously with the movement of the mold table of a glass forming machine and which removes a finished article therefrom and deposits it in inverted position on a support adjacent the mold table.

A further object is to construct a device which automatically removes the finished article from the mold table of a glass forming machine, deposits it in an inverted position on a support adjacent the table and from thence automatically removes it from said support and passes it on a conveyor which deposits it in the annealing furnace or leer.

A still further object is to construct an automatically operated means controlled synchronously with the rotation of a mold table of a glass forming machine by means of which the finished article is removed from a mold table and deposited in the leer whereby the handling of the finished article from the mold table to the leer by workmen is eliminated. Thus the cost of production is considerably reduced.

In the drawings:

Fig. 1 is a fragmental top plan view of a mold table and its support showing my device in position;

Fig. 2 is a front elevation of the same;

Fig. 3 is a side elevation viewed in the direction of the arrow 3 in Fig. 1;

Fig. 4 is a fragmental view of the mechanism for operating the gripping device with parts broken away and parts in section;

Fig. 5 is an enlarged section of the gripping mechanism taken on the line 5—5 of Fig. 1 showing the manner of gripping the upper edge of the article before its removal from the table;

Fig. 6 is a similar view illustrating the gripping mechanism as just ready to deposit the finished article on the support;

Fig. 7 is an enlarged fragmental section showing the manner of mounting the gripping ring;

Fig. 8 is an enlarged horizontal section of the valve employed for operating the take-off mechanism;

Fig. 9 is an enlarged top plan view of the gripping mechanism showing the same in open position by dotted lines;

Fig. 10 is a vertical section taken on the line 10—10 of Fig. 9;

Fig. 11 is an enlarged fragmental view of the means for opening the gripping means to enable the finished article to be deposited on a support;

Fig. 12 is an enlarged vertical section of the valve made use of for removing the finished article from the support;

Fig. 13 is an enlarged perspective view of the pivoted dog employed for operating one of the gripping arms;

Fig. 14 is a perspective view of the lever employed for operating the pivoted dog; and Fig. 15 is a perspective view of the adjustable dog employed for operating the other gripping arm.

In the construction of my device I employ a mold table of the rotary type having a base 17, which base is mounted on rollers 18 which in turn are mounted on tracks 19. This permits the table to be moved to and from the glass furnace, not shown. Secured to the base 17 is a column 20 on which is rotatably mounted a table 21. Secured to the table at spaced apart intervals are molds 22 which are provided with a false bottom 23. Extending through the table 21 is a plunger 24 which is adapted to contact with the inclined face 25 of the table rotating means 26. This table rotating means is provided with a flat surface 27, the purpose of which will be explained in detail later. The table rotating means 26 is also provided with a spring actuated plunger 28 which engages with recesses formed on the underside of the table so that the same may be moved step by step. The table rotating means 26 is mounted on the column 20 and is operated by means of an air cylinder 29 in which a piston is located which moves back and forward thus swinging the table rotating means 26 and it in turn on its forward stroke swinging idly and not moving the table but on its return stroke having the plunger 28 engaging with a recess formed in the underside of the table 21 and rotating the table sufficiently to advance the molds carried by the table in position for the next operation. Secured to the column 20 and located above the table is a collar 30, this collar is immovably mounted and prevents the table from rising. Secured to the collar 30 is a bracket 31 which is provided with a bolt 32, this bolt in turn adjustably secures a bracket 33 to the bracket 31. Secured to the bracket 33 is an air cylinder 34. The bracket 33 is also provided with arms 35 and 36 which are spaced apart and to these arms are secured bearings 37 and 38 through which the cylindrical ends 39 and 40 of a rectangular bar 41 project so that said bar is pivotally mounted. Secured to the bar 41 is a plate 42, to which are pivotally secured arms 43 and 44, which arms are a part of the gripping mechanism, the forward part of these arms is curved as at 45 and 46 so as to leave a substantially circular opening between them, the outer ends of the arms, however, abutting (see Fig. 9).

The curved portion of each arm is provided with openings 47 through which screws 48 pass, these screws are for the purpose of securing the gripping ring sections 49 and 50 in position. The lower portion of the ring sections is tapered as indicated by the numeral 51, this is for the purpose of centering the article should it happen that the article is slightly shifted to one side of the center. Adjacent the inclined portion 51 is a gripping shoulder 52 which is designed to contact with the article and hold it. Immediately above the projection or shoulder 52 is a recess 53 which is for the purpose of receiving a bead or flange, should one be formed around the upper edge of the article.

The upper portion of each ring section has an inwardly projecting flange 54 which projects slightly over the edge of the finished article and prevents it from falling out of the ring when the article has been inverted, as in Fig. 6. It is not necessary that the ring sections 49 and 50 exert any pressure on the article, the projection 52 merely being a snug fit, the outward flare of the finished article preventing it from passing through the ring, this is clearly shown in Fig. 5.

The arms 43 and 44 are pivotally secured to the plate 42 at the point indicated by the numeral 55. To the rear of this pivoted portion and secured to the arms 43 and 44 are angle irons or brackets 56 and 57, these are preferably secured to the arms by means of rivets or bolts but may be formed integral therewith, if desired. Extending through the upwardly projecting portions of the angle irons is a bar 58 around which is located a coil spring 59. The ends of this coil spring bear against the brackets 56 and 57 respectively, and hold the gripping members in closed position.

Secured to the plate 42 and located adjacent the arms 43 and 44 are upwardly projecting studs 60, these studs are for the purpose of preventing the gripping members from swinging to the right or left when in closed position and assure the centering of the gripping ring over the mold.

Carried by the cylindrical portion 40 of the bar 41 is a pinion 61, this pinion is rigidly secured to said portion and is for the purpose of swinging the plate together with the gripping arms so that the article may be deposited in inverted position on a support adjacent the mold table. The pinion 61 is operated by means of the rack 62 which is secured to the piston rod 63 which projects from the air cylinder 34. The rack 62 has a smooth portion 64, the purpose of which will be explained in detail later. Secured to the forward side of the rack is an adjustable dog 65 which is adapted to contact with the bracket or angle iron 56 for opening one side of the gripping ring. On the upper face of the rack 62 is secured a lever 66 which has a projecting end 67, this end is adapted to contact with the arm 68 of the pivoted dog 69. The dog 69 is pivoted in a bracket 70 carried by the air cylinder 34. This dog also has a downwardly projecting arm 71 which is adapted to contact with the bracket or angle iron 57 so that when the pivoted dog is rocked it will operate the arm 44, this operation will be explained in detail later.

Secured to the arm 36 is a bracket 72 to which is pivotally secured a roller 73, the purpose of this roller is to keep the rack in mesh with the pinion and to prevent any possibility of its lifting or springing outward.

Connected to the air cylinder 34 are pipes 74 and 75, these pipes terminating in a valve 76 to which is connected an air pipe 77 which leads to any suitable source of air supply. The valve 76 is provided with a gate 78 which is so arranged that when air is admitted through the pipe 77 it will permit the air to pass into only one of the pipes 74 or 75 at a time, and simultaneously with such passage of air connects to the other pipe with the exhaust port 79 of the valve. This is for the purpose of preventing any back pressure being set up in the air cylinder which would effect the ready movement and consequently the timing of the device.

The gate 78 is provided with a lever 80 which in turn is connected to a spring actuated rod 81, this rod is slidably mounted in a support 82 carried by the column 20. Its free end is adapted to contact with a cam or inclined surface 83 which is carried by the plunger 84. This plunger is operated synchronously with the movement of the mold table and being part of a commercial device now in common use its operation and synchronizing with the movement of the table will not be described in detail.

Secured to the base 17 is a support 85 to which is adjustably connected a second support 86, these supports are held together by means of a bolt 87. Secured to the upper portion of the support 86 is a bracket 88 on which is connected a support 89. The support 89 is also provided with an arm 90 by means of which it is secured to the underside of the bearing 37, the forward portion of the support 89 is inclined as at 91. The support 89 is also provided with an opening 92 which extends therethrough at an angle which inclines upwardly and toward the inclined portion 91.

To the underside of the support 89 is secured a block 93 which is provided with an opening 94, this opening is brought in alinement with the opening 92 so as to permit free passage of air through the block and through the opening 92. The block has secured thereto one end of an air hose or pipe 95, the opposite end being connected to the nipple 96 of the valve 97. Diametrically opposite the nipple 96 is a second nipple 98 to which is secured an air hose 99 which leads to any suitable source of supply. The valve 97 is carried by the support 89 and is provided with a piston 100 which has a cut away portion or groove 101. The piston 100 is also provided with a rod 102 which is provided with a head 103. The rod 102 is surrounded by a coil spring 104 for normally holding the valve in closed position, as illustrated in Fig. 12. The head 103 of the rod 102 is adapted to come in contact with cam projections 105 formed on the periphery of the mold table 21. These projections are of a sufficient height to force the piston 100 into the valve a sufficient distance to bring the groove 101 in alinement with the nipples 96 and 98 and thus permit a jet of air to pass through the valve and out through the opening 92.

Carried by the bearing 38 and parallel to the support 89 is an arm 106 which is provided with a cut away portion having inclined edges 107 and 108. These inclined edges extend toward each other so that the bottom of the cut away portion will be narrower than the top (see Fig. 11), the purpose of this is to engage with the upward portion of the brackets or angle irons 56 and 57 and force them toward each other so as to open the gripping jaws and thus release the finished article and permit it to drop downward a sufficient distance on the table so that the gripping rings will not contact with the finished article which has been deposited when they are moved back to their original position.

The operation of my device is as follows:—

After the machine has been run forward on the track so as to bring it into operative position, the compressed air supply is turned on. This turning on of the air supply permits air to enter the cylinder 29 and bring the rotating mechanism 26 forward until such time as the pin 28 drops into one of the depressions on the underside of the table 21. At this point the flow of air to the rear side of the cylinder is cut off and air enters the front portion of the cylinder thus moving the table rotating mechanism backward and moving the table sufficiently far to bring a fresh mold in charging position. As soon as the fresh mold has been brought in charging position, the member 26 again moves forward and in so doing automatically releases the pin or plunger 28 from the depression leaving the table stand stationary to receive its next charge. During this stationary period of the table the forming plunger 84 descends into the mold which has just been filled and presses out or opens the center of the gob, after which it immediately rises again and is clear of the mold for the next revolution. The glass article passes through various other stages well known in the art until it is finished at which time it will be underneath the gripping ring, as illustrated in Figs. 1 and 2, then upon a slight forward movement of the rotating member 26, the plunger 24 will rise up on the inclined surface 25 and this will push up the finished article. During this period however, compressed air has been entering the pipe 74 thus drawing in the piston rod to its fullest extent and causing the pivoted dog 69 and the adjustable dog 65 to contact with the brackets or angle irons 56 and 57 bringing the gripping member in open position, as indicated in dotted lines in Fig. 9, thereby permitting the finished article to enter between the spread jaws of the gripping member.

The member 26 then moves forward to engage in the next recess or another step in the revolution and while so doing the plunger 24 rides on the flat surface 27 of the member 26 holding the article up in position. At this point the plunger 84 descends into a freshly charged mold and in so doing causes the inclined or cam face 83 to contact with the end of the rod 81, pushes it forward and swinging the valve 78 so as to permit air to enter the pipe 75 and to the rear of the piston located in the cylinder 34 thus moving the piston rod out of the cylinder.

The smooth part 64 of the rack 62 rides on the pinion 61 without causing any movement of the pinion, this releases the two dogs from the angle irons 56 and 57 and permits the jaws to close. A continued movement outward of this piston rod 63 causes the rack 62 to engage with the pinion 61 thereby rotating the bar 41 and carrying with it the plate 42 to which the gripping member is pivotally secured. This causes the gripping member to swing over into a position above the support 89 and in the last stages of its swinging, the upwardly projecting portions of the angle irons 56 and 57 come in contact with the inclined edges of the recess formed in the bracket 106. Continued movement of the plate 42 forces these projections downward and together releasing the finished article.

During the swinging of the article from the mold table to the support, its end is prevented from falling out of the gripping ring, in the first place by reason of the outward flare of the article, and after passing over the center by means of the rib or flange 54. As soon however, as the angle irons 56 and 57 are brought together by means of the inclined edges 107 and 108 of the recess formed in the bracket 106, the gripping ring sections are spread apart and permit the finished article to come to rest in an inverted position on the support 89, as illustrated by the dotted circle in Fig. 1.

The plunger 84 having now performed its function is again raised up and the gate 78 moved into the position indicated in Fig. 8. This causes the rack to work in the opposite direction and brings back the gripping arms to their starting position and a further movement inward of the piston rod 63 again opens the jaws ready for the finished article. The finished article is now deposited in inverted position on the support 89 and in moving forward the flattened surface 27 of the member 26 has passed the plunger 24 permitting it to drop. The table is now rotated to bring a freshly charged mold underneath the plunger 84 and in so doing the projection 105 contacts with the head 103 of the piston rod 102 driving it inward and moving the piston so that the groove 101 will be in alinement with the nipples 96 and 98, permitting air to enter the pipe 95 and out through the opening 92 in the plate 89.

It will be noted that the projection 105 is relatively small so that only a puff of air will be emitted from the opening 92. This puff of air, due to the inclination of the opening 92, is directed against the wall of the article adjacent the inclined portion 91 and is of sufficient force to slide it from the support 89 on to the inclined portion 91, down which it slides on to any suitable means for conveying it to the leer. This is preferably an endless conveyor although any other mechanical means may be employed.

From the foregoing it will be seen that my operation is entirely automatic and synchronized with the movement of the mold table so that there will be no possibility of the movements getting out of time.

While I have shown one form of synchronizing mechanism, I do not desire to limit myself thereto as there may be various other manners of operating the various valves to remove the article, first from the mold table and then from the support, without departing from the spirit of my invention. The primary object being to remove the finished article from the molding machine and deposit it in the leer mechanically and automatically, and to operate such means synchronously with the movement of the mold table.

Having fully described my invention, what I claim is:—

1. A take-off device comprising a stationary support having a horizontal and an inclined portion, a gripping mechanism, means for operating said gripping mechanism synchronously with the movement of a rotary glass forming machine table whereby a finished article is removed from said table, means for inverting said gripping mechanism thereby depositing said finished article in inverted position on the horizontal portion of said support, and means for moving said deposited finished article on to the inclined portion of said support after the gripping mechanism has released said article and moved out of its way.

2. A take-off device comprising a stationary support provided with an inclined portion and a horizontal portion, a gripping mechanism, removable ring sections carried by said gripping mechanism, a support for said gripping mechanism, means for operating said gripping mechanism at timed intervals so as to grip and remove a finished article from the molds of a glass forming machine, means for inverting said gripping mechanism, and means for releasing said gripping mechanism when the same has been inverted whereby said finished article is deposited on said support adjacent its inclined portion, there being means for removing said article so deposited onto the inclined portion of the support after the gripping mechanism has released said article and commenced to return to its starting position.

3. A take-off device comprising a stationary support, a gripping mechanism, a support for said gripping mechanism, means for operating and inverting said gripping mechanism at timed intervals whereby a finished article is gripped and removed from the molds of a glass forming machine and deposited in inverted position on said stationary support, and an intermittent blast of air for moving said article from said support.

4. A take-off device comprising a stationary support having a horizontal and an inclined portion, a gripping mechanism, means for operating and inverting said gripping mechanism synchronously with the movement of a rotary glass forming machine whereby a finished article is removed from said table and deposited in inverted position on said support, and an air blast intermittently operated for moving said finished article onto the inclined portion of said support after the gripping mechanism has moved away therefrom whereby said article will automatically pass to a conveyor.

5. A take-off device comprising a stationary support, a gripping mechanism, a support for said gripping mechanism, means for operating and inverting said gripping mechanism at timed intervals whereby a finished article is gripped and removed from the molds of a glass forming machine and deposited in inverted position on said stationary support, and an intermittently operated air blast adapted to be directed at an angle against a portion of the inside of said article when so deposited for removing the same from said stationary support.

In testimony whereof, I have signed my name to this specification.

HARRY B. LAWSON.